(12) United States Patent
Chang

(10) Patent No.: US 7,445,359 B2
(45) Date of Patent: Nov. 4, 2008

(54) OPTICAL LENS AND LIGHT EMITTING DIODE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/627,736

(22) Filed: Jan. 26, 2007

(65) Prior Publication Data
US 2008/0144323 A1    Jun. 19, 2008

(51) Int. Cl.
*F21V 5/00* (2006.01)
*G02B 3/00* (2006.01)

(52) U.S. Cl. .................... 362/331; 362/310; 362/335; 359/664

(58) Field of Classification Search .............. 362/257, 362/327, 293, 294, 310, 331, 335; 359/641, 359/664
See application file for complete search history.

(56) References Cited

U.S. PATENT DOCUMENTS

| | | | | |
|---|---|---|---|---|
| 6,097,549 | A * | 8/2000 | Jenkins et al. | 359/726 |
| 6,953,271 | B2 * | 10/2005 | Aynie et al. | 362/511 |
| 6,972,439 | B1 * | 12/2005 | Kim et al. | 257/98 |
| 7,322,721 | B2 * | 1/2008 | Noh et al. | 362/327 |
| 7,347,590 | B2 * | 3/2008 | Lee et al. | 362/327 |
| 2006/0171151 | A1 * | 8/2006 | Park et al. | 362/327 |

* cited by examiner

*Primary Examiner*—John A Ward
(74) *Attorney, Agent, or Firm*—Steven M. Reiss

(57) ABSTRACT

An exemplary light emitting diode (30) includes a light output unit (31), an optical lens (33), and a reflective sheet (35). The optical lens is mounted on the light output unit. The optical lens includes a light input surface (331), a generally funnel-shaped top surface (333) and a light output surface (335). The funnel-shaped top surface is distal from the light input surface. The light output surface generally between the light input surface and the top surface is an annular bulging surface. It is relatively easy to configure an injection mold for making the optical lens.

16 Claims, 6 Drawing Sheets

OPTICAL LENS AND LIGHT EMITTING DIODE USING THE SAME

BACKGROUND OF THE INVENTION

1. Field of the Invention

The present invention relates to optical lenses and light emitting diodes using optical lenses, and more particularly to a side-emitting light emitting diode typically employed in a direct type backlight module of a liquid crystal display.

2. Discussion of the Related Art

Typically, a light source of a backlight module is one of the following two types: a cold cathode fluorescence lamp (CCFL), or a light emitting diode (LED). Disadvantages of a CCFL include high energy consumption, low optical uniformity, and poor purity of white light. In addition, after being repeatedly used over time, a brightness of the CCFL becomes degraded and a color of light emitted by the CCFL tends to shift. In general, the service life of a CCFL is about 15,000 to 25,000 hours. Furthermore, a CCFL only covers 75 percent of color space as defined by the National Television Standards Committee (NTSC). Therefore, using a CCFL cannot satisfy the requirements for a high quality color liquid crystal display. Unlike CCFLs, high powered LEDs can cover as much as 105 percent of color space as defined by the NTSC. In addition, these LEDs have other advantages such as low energy consumption, long service life, and so on. Therefore, high power LEDs are better suited for producing high quality color liquid crystal displays. In particular, side-emitting high power LEDs are widely used in direct type backlight modules of such liquid crystal displays.

FIG. 6 illustrates a side-emitting LED 10 of relevance. The LED 10 includes a light output unit 11, and an optical lens 13 coupled to the light output unit 11. The optical lens 13 includes a light input surface 131, a top interface 133 opposite to the light input surface 131, and a peripheral light output surface 135 generally between the light input surface 131 and the top interface 133. The light output surface 135 includes a first refractive surface 1351, and a second refractive surface 1353 adjacent to the first refractive surface 1351. The first refractive surface 1351 has the shape of a periphery of a frustum. The second refractive surface 1353 has the shape of an outer portion of a flat-topped dome. The LED 10 further includes a reflective surface 15 covering the top interface 133. Light rays emitted by the light output unit 11 enter the optical lens 13 through the light input surface 131 and transmit to the top interface 133. Many or most of the light rays undergo total internal reflection at the top interface 133 or are reflected back into the optical lens 13 by the reflective surface 15, and then exit the optical lens 13 through the light output surface 135. The light output surface 135 is configured to refract and bend light so that the light rays exit from the optical lens 13 at angles as close to 90 degrees relative to a central axis 16 of the LED 10 as possible.

Typically, the optical lens 13 is manufactured by injection molding technology. However, the structure of the light output surface 135 is relatively complex. This means an injection mold used for making the optical lens 13 is correspondingly complex. Thus the cost of making (or purchasing) and maintaining the injection mold may be unduly high.

What is needed, therefore, is an optical lens and light emitting diode using the optical lens which can overcome the above-described shortcomings.

SUMMARY

In one aspect, an optical lens according to a preferred embodiment includes a light input surface, a generally funnel-shaped top surface and a light output surface. The funnel-shaped top surface is distal from the light input surface. The light output surface generally between the light input surface and the top surface is an annular bulging surface.

In another aspect, a light emitting diode according to a preferred embodiment includes a light output unit and an optical lens. The same optical lens as described in the previous paragraph is employed in this embodiment. The optical lens is coupled to the light output unit, and the light input surface of the optical lens faces the light output unit.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical lens and light emitting diode using the optical lens. Moreover, in the drawings, like reference numerals designate corresponding parts throughout the several views, and all the views are schematic.

DETAILED DESCRIPTION OF THE PREFERRED EMBODIMENTS

References will now be made to the drawings to describe preferred embodiments of the present optical lens and light emitting diode using the optical lens, in detail.

Figure 1:
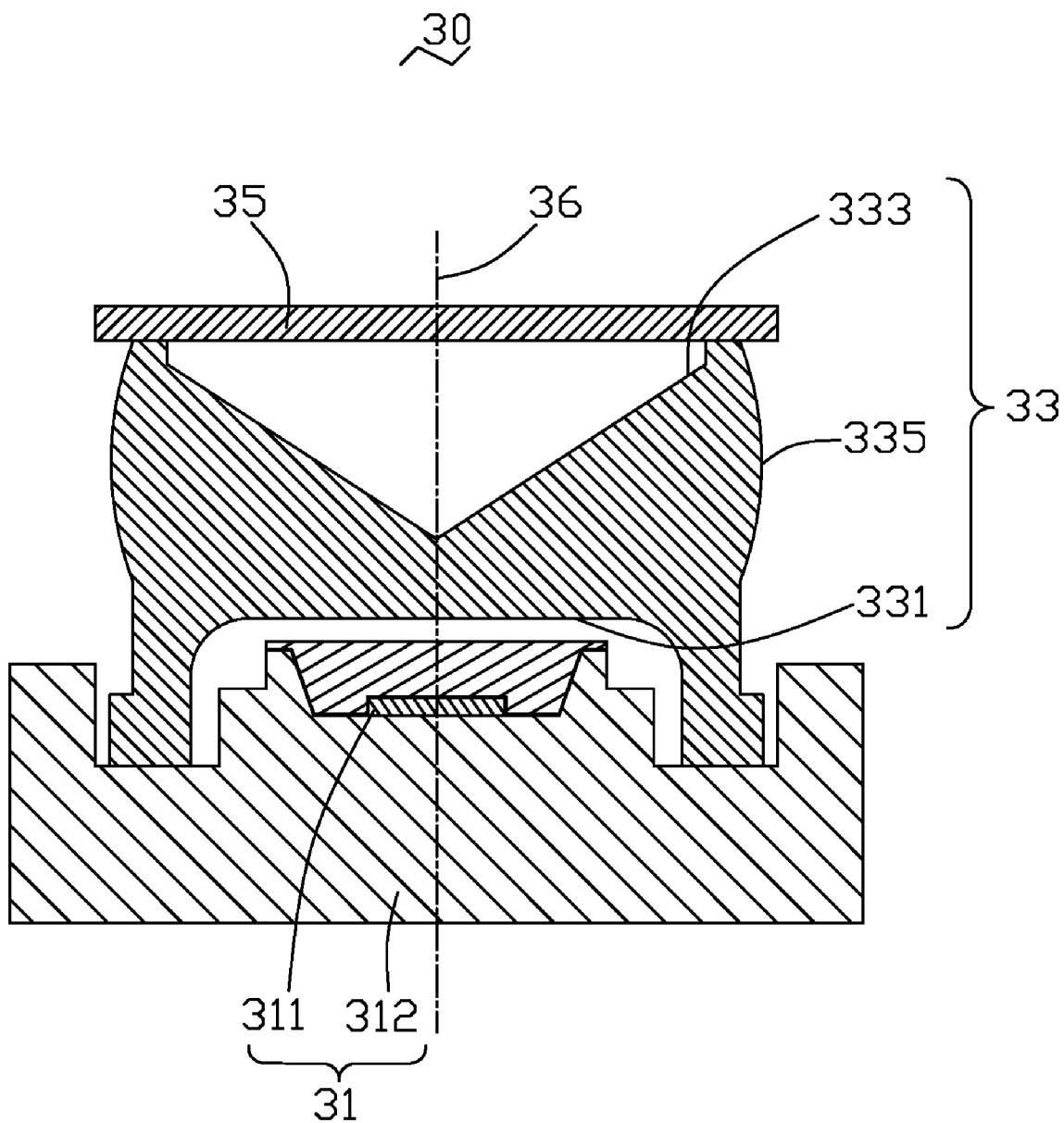
FIG. 1 is a side, cross-sectional view of an LED having an optical lens according to a first preferred embodiment of the present invention.

Referring to FIG. 1, a light emitting diode 30 in accordance with a first preferred embodiment of the present invention is shown. The light emitting diode 30 includes a light output unit 31, an optical lens 33, and a reflective sheet 35. The light emitting diode 30 defines a vertical central axis 36 that passes through centers of the light output unit 31 and the optical lens 33. The light output unit 31 includes a base 312, and a semiconductor chip 311 fixed on the base 312. The semiconductor chip 311 has a light emitting PN (P-type silicon, N-type silicon) junction.

Figure 2:
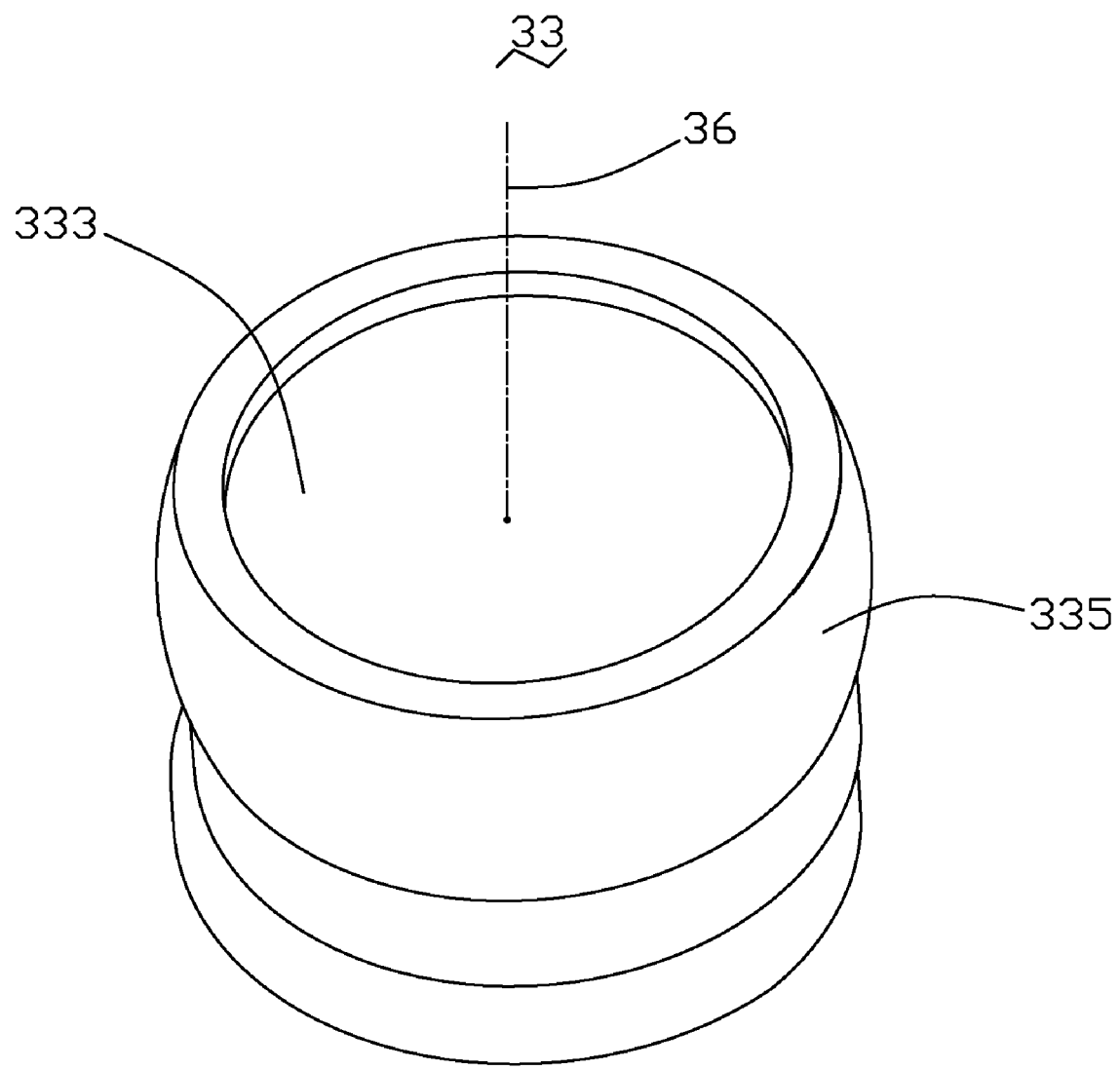
FIG. 2 is an isometric view of the optical lens of FIG. 1.

Also referring to FIG. 2, the optical lens 33 includes a light input surface 331, a top surface 333 distal from the light input surface 331, and a peripheral light output surface 335 generally between the light input surface 331 and the top surface 333. The light input surface 331 has the shape of a flat-topped dome. The top surface 333 is generally funnel-shaped. In the illustrated embodiment, the funnel shape of the top surface 333 progressively flares out from a bottom of the top surface 333 to a top of the top surface 333, and a cross-section of the top surface 333 taken through the central axis 36 is generally V-shaped. The light output surface 335 is an annular bulging surface. In the illustrated embodiment, the light output surface 335 is a spherical surface. A center point defined by the spherical surface is located on the central axis 36 of the optical lens 33, between the bottom of the top surface 333 and the top of the top surface 333. A radius of a sphere defined by the spherical surface is configured to be larger than 1 millimeter. The optical lens 33 is snap-fitted or otherwise mounted onto the base 312 of the light output unit 31. Thereby, the light input surface 331 faces the semiconductor chip 311, and the light input surface 331 and the base 312 cooperate to completely surround the semiconductor chip 311. The funnel shape of the top surface 333 is configured to reflect light, so that the light exits from the light output surface 335 at angles as close to 90 degrees relative to the central axis 36 as possible.

The reflective sheet 35 is affixed on a peripheral rim of the top surface 333 via an adhesive member (not shown). The adhesive member can be either a thin layer of adhesive material or a piece of double-sided adhesive tape. The adhesive member can be either transparent or opaque. The reflective sheet 35 is a disk-like metal sheet, which is configured to entirely cover the top surface 333. The metal sheet is preferably made of either aluminum or silver. The reflective sheet 35 is provided for preventing light that escapes through the top surface 333 from transmitting to regions above the light emitting diode 30. This enables a significant amount of light rays to output through the light output surface 335 of the optical lens 33. In an alternative embodiment, the reflective sheet 35 can include a transparent base sheet, and a thin metal film coated on the transparent base sheet. The thin metal film is located at a side of the reflective sheet 35 nearest to the optical lens 33.

Light rays emitted by the light output unit 31 enter the optical lens 33 through the light input surface 331. Many or most of the light rays transmit to the top surface 333. Many or most of the light rays reaching the top surface 333 undergo total reflection at the top surface 333. Other light rays escape from the top surface 333, and are reflected back into the optical lens 33 by the reflective sheet 35. Finally, all the light rays exit the optical lens 33 through the light output surface 335. The present optical lens 33 is manufactured by injection molding technology. Because the light output surface 335 is a single annular, bulging surface, it is relatively easy to configure an injection mold for making the optical lens 33.

Figure 3:
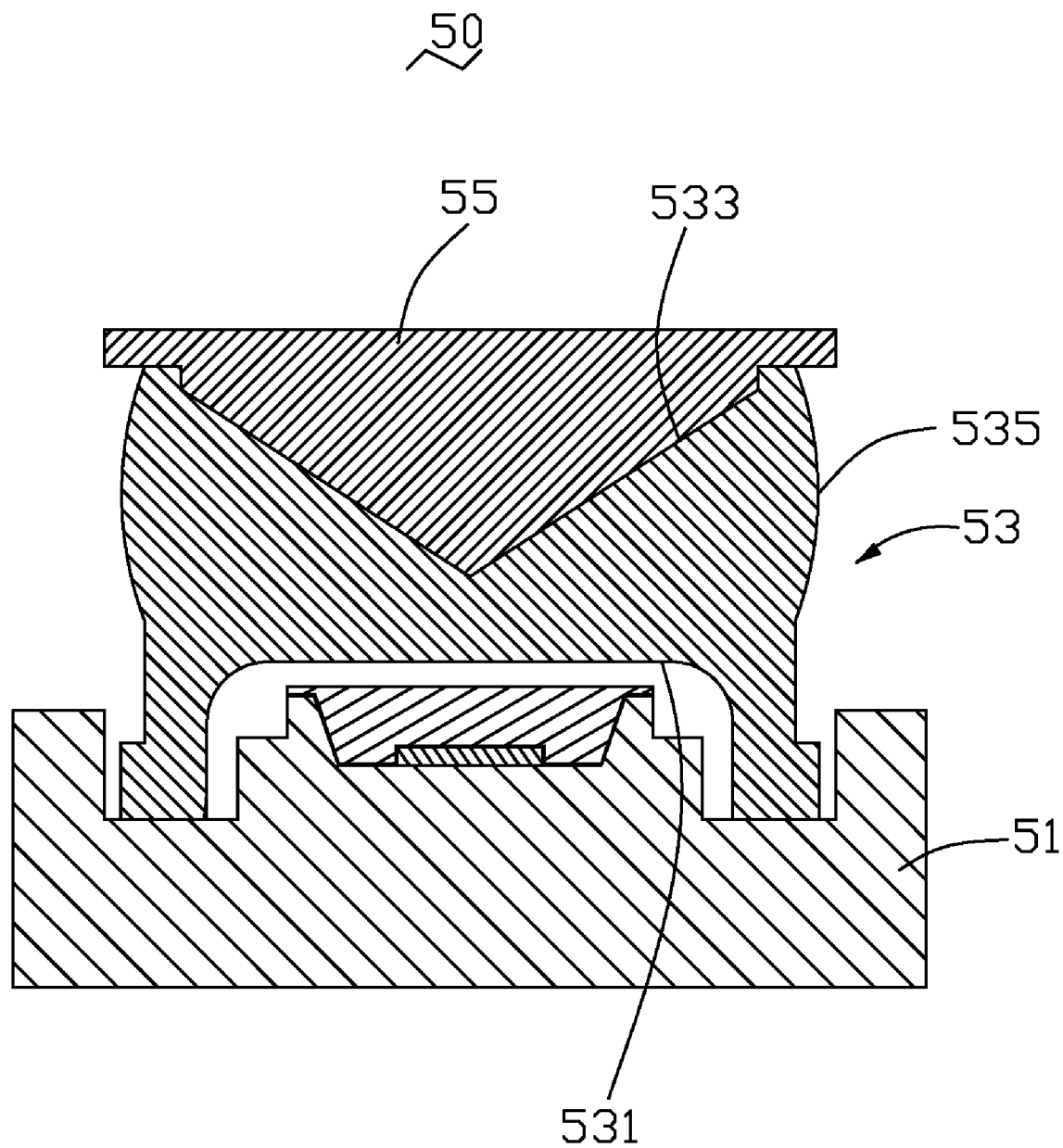
FIG. 3 is a side, cross-sectional view of an LED having an optical lens according to a second preferred embodiment of the present invention.

Referring to FIG. 3, a light emitting diode 50 in accordance with a second preferred embodiment of the present invention is shown. The light emitting diode 50 includes a light output unit 51, an optical lens 53, and a reflective resin member 55. The reflective resin member 55 is integrally manufactured on a top interface 533 of the optical lens 53 by a multi-shot injection molding method. That is, the reflective resin member 55 and the optical lens 53 are formed as a single unitary body, with the reflective resin member 55 adjoining the optical lens 53. In particular, the reflective resin member 55 is in immediate contact with the top interface 533 of the optical lens 53, with no intervening space therebetween. The reflective resin member 55 is made of a transparent resin matrix material having a plurality of reflective particles (not shown) dispersed therein. An outer surface (not labeled) of the reflective resin member 55 opposite to the light input surface 531 is configured to be a flat surface. The top interface 533 is configured to reflect light so that the light exits from a light output surface 535 of the optical lens 53 at angles as close to 90 degrees relative to a vertical central axis (not shown) of the light emitting diode 50 as possible.

Many or most of the light rays that reach the top interface 533 undergo total reflection at the top interface 533. Other light rays escape from the top interface 533, and are reflected back into the optical lens 53 by the reflective resin member 55. Finally, all the light rays exit the optical lens 53 through the light output surface 535. The reflective resin member 55 is configured for preventing light that escapes through the top interface 533 from transmitting to regions above the light emitting diode 50. This enables a significant amount of light rays to output through the light output surface 535 of the optical lens 53.

Figure 4:
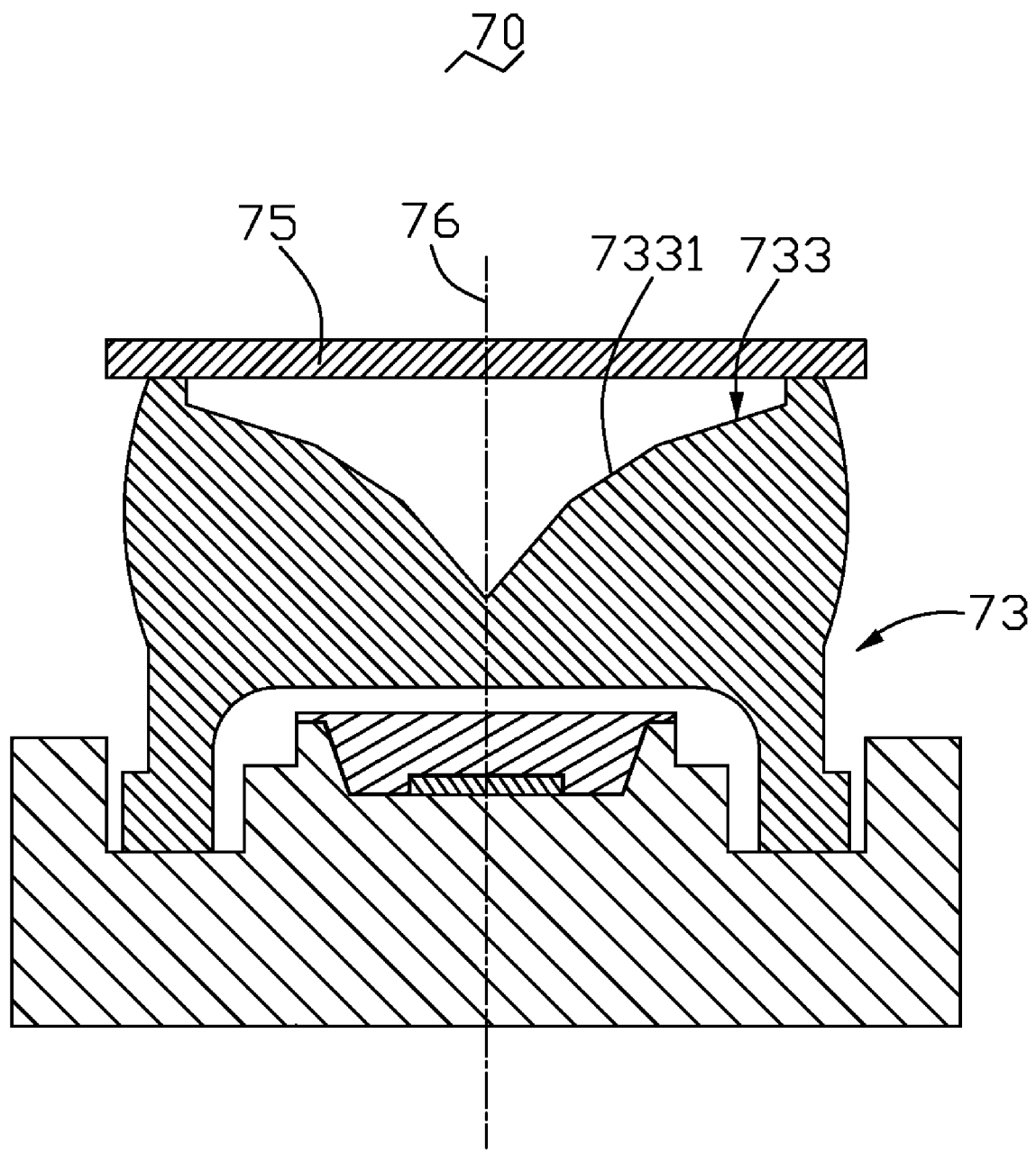
FIG. 4 is a side, cross-sectional view of an LED having an optical lens according to a third preferred embodiment of the present invention.
Figure 5:
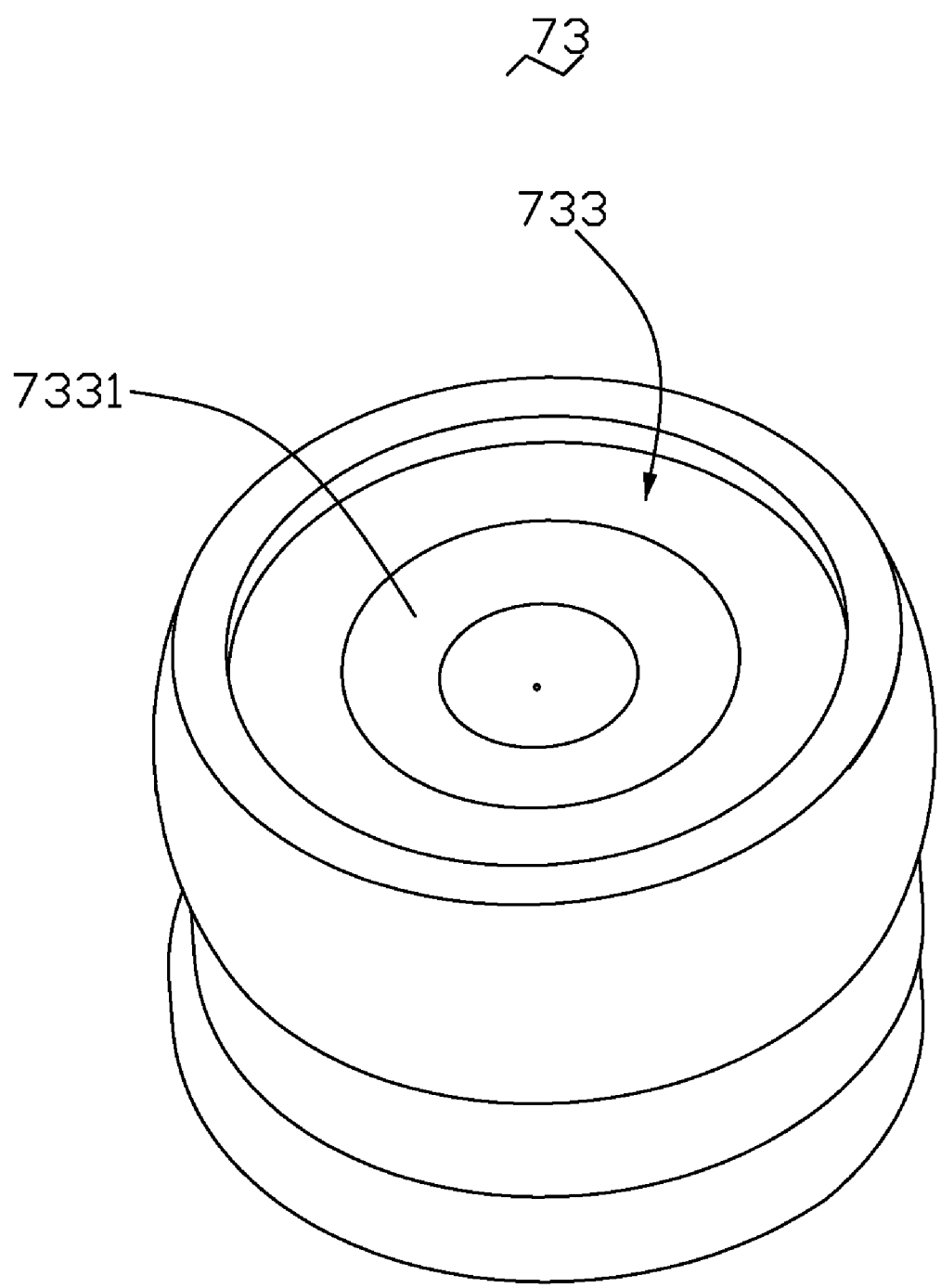
FIG. 5 is an isometric view of the optical lens of FIG. 4.
Figure 6:
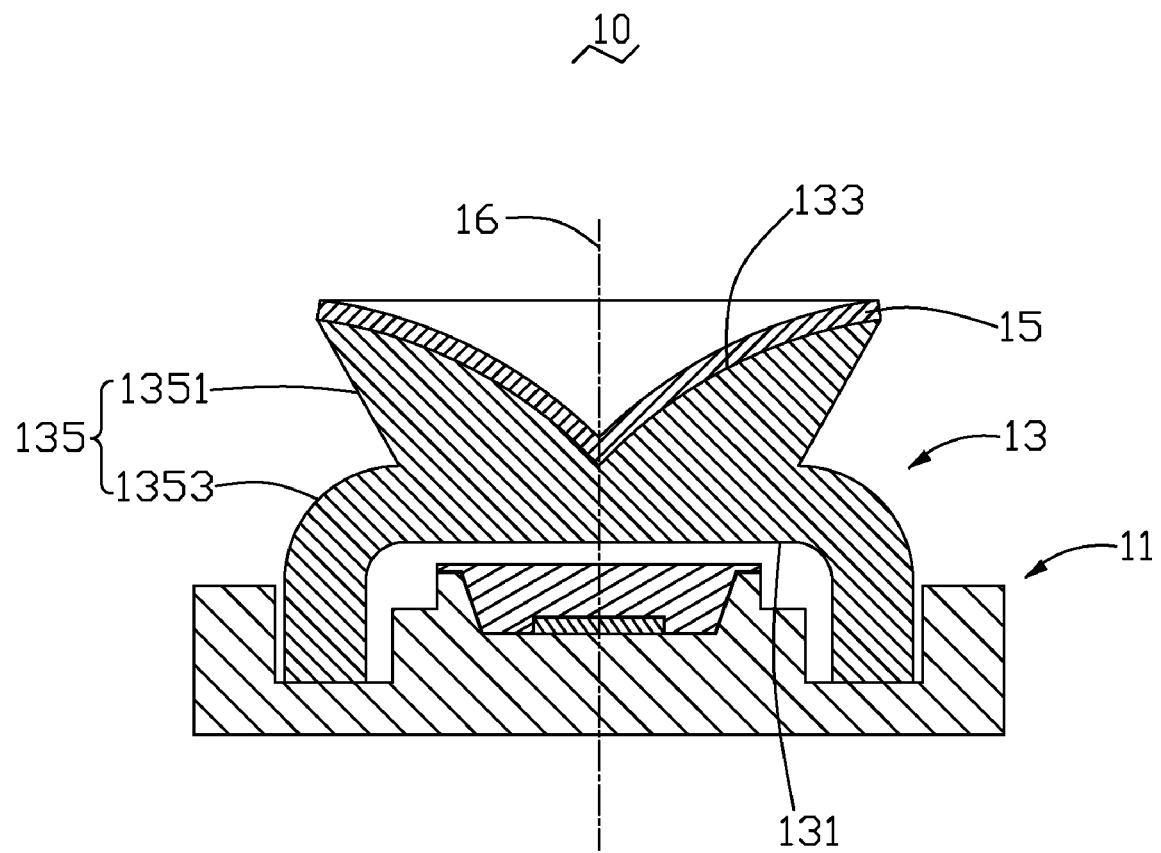
FIG. 6 is a side, cross-sectional view of a side-emitting LED of relevance in the related art.

Referring to FIGS. 4 and 5, a light emitting diode 70 in accordance with a third preferred embodiment of the present invention is shown. The light emitting diode 70 is similar in principle to the light emitting diode 30 of the first embodiment. The light emitting diode 70 includes an optical lens 73 and a reflective sheet 75. A top surface 733 of the optical lens 73 includes a plurality of conic surfaces 7331 interconnecting with each other. The conic surfaces 7331 have different slanted angles with respect to a vertical central axis 76 of the optical lens 73. The slanted angles progressively increase from a bottommost one of the conic surfaces 7331 to a topmost one of the conic surfaces 7331. The conic surfaces 7331 are configured to reflect light so that the light exits from a light output surface (not labeled) of the optical lens 73 at angles as close to 90 degrees relative to the central axis 76 as possible.

In an alternative embodiment, the conic surfaces 7331 of the top surface 733 of the optical lens 73 can be configured to be total reflective surfaces. In such case, the reflective sheet 75 can be omitted. In another alternative embodiment, the top surface 733 can be replaced by another kind of generally funnel-shaped top surface, which includes a plurality of interconnecting curved conic surfaces. Each curved conic surface is slightly convex.

It should be noted that the above-described optical lenses and light emitting diodes using the optical lenses are configured as symmetrical structures. However, in alternative embodiments, an optical lens and/or a light emitting diode using the optical lens can have one or more asymmetrical structures. For example, a bottommost end of the funnel shaped top surface can be offset from the central axis of the light emitting diode. In another example, a vertical central axis of the semiconductor chip of the light output unit can be offset from the central axis of the light emitting diode.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical lens having a central axis and comprising:
   a bottom light input surface;
   a generally concave top surface comprising a plurality of conic surfaces, the angle of the conic surface with respect to the central axis progressively increases towards a periphery of the concave surface; and
   a side light output surface located generally around the top surface on an outmost periphery of the optical lens, wherein the side light output surface is a bulging surface.

2. The optical lens according to claim 1, wherein the side light output surface is a spherical surface.

3. The optical lens according to claim 2, wherein a center of a sphere defined by the spherical surface is located on the central axis of the optical lens.

4. The optical lens according to claim 3, wherein the center of the sphere defined by the spherical surface is located on the central axis of the optical lens between an inmost end of the top surface and an outmost end of the top surface.

5. The optical lens according to claim 2, wherein a radius of a sphere defined by the spherical surface is greater than 1 millimeter.

6. The optical lens according to claim 1, wherein the light input surface has the shape of a flat-topped dome.

7. A light emitting diode comprising:
a light output unit; and
an optical lens mounted over the light output unit, the optical lens having a central axis comprising:
a bottom light input surface facing the light output unit;
a generally concave top surface comprising a plurality of conic surfaces, the angle of the conic surface with respect to the central axis progressively increases towards a periphery of the concave surface; and
a side light output surface located generally around the top surface on an outmost periphery of the optical lens, wherein the light output surface is a bulging surface.

8. The light emitting diode according to claim 7, wherein the side light output surface is a spherical surface.

9. The light emitting diode according to claim 8, wherein a center of a sphere defined by the spherical surface is located on the central axis of the optical lens.

10. The light emitting diode according to claim 9, wherein the center of the sphere defined by the spherical surface is located on the central axis of the optical lens between an inmost end of the top surface and an outmost end of the top surface.

11. The light emitting diode according to claim 8, wherein a radius of a sphere defined by the spherical surface is greater than 1 millimeter.

12. The light emitting diode according to claim 7, wherein the light input surface has the shape of a flat-topped dome.

13. The light emitting diode according to claim 7, further comprising a reflective sheet affixed on a peripheral rim of the top surface of the optical lens by an adhesive member.

14. The light emitting diode according to claim 7, further comprising a reflective resin member integrally formed on and in immediate contact with the top surface of the optical lens.

15. The light emitting diode according to claim 14, wherein the reflective resin member is made of a transparent resin matrix material having a plurality of reflective particles dispersed therein.

16. The optical lens according to claim 1, wherein a topmost extremity of the light output surface is a circle at a top of the optical lens, and a transverse cross-section of any portion of the light output surface is a curve.

* * * * *